(12) United States Patent
Bosch

(10) Patent No.: US 10,144,169 B2
(45) Date of Patent: Dec. 4, 2018

(54) THERMOFORMING DEVICE

(71) Applicant: BOSCH SPRANG BEHEER B.V., Sprang-Capelle (NL)

(72) Inventor: Antoni Bosch, Sprang-Capelle (NL)

(73) Assignee: BOSCH SPRANG B.V., Sprang-Capelle (NL)

( * ) Notice: Subject to any disclaimer, the term of this patent is extended or adjusted under 35 U.S.C. 154(b) by 154 days.

(21) Appl. No.: 14/901,428

(22) PCT Filed: Jun. 27, 2014

(86) PCT No.: PCT/NL2014/050427
§ 371 (c)(1),
(2) Date: Dec. 28, 2015

(87) PCT Pub. No.: WO2014/209125
PCT Pub. Date: Dec. 31, 2014

(65) Prior Publication Data
US 2016/0167286 A1    Jun. 16, 2016

(30) Foreign Application Priority Data

Jun. 27, 2013   (NL) ..................................... 2011052

(51) Int. Cl.
| | | |
|---|---|---|
| *B29C 51/44* | (2006.01) | |
| *B29C 51/08* | (2006.01) | |
| *B29C 51/38* | (2006.01) | |
| *B29L 31/00* | (2006.01) | |
| *B29C 51/04* | (2006.01) | |

(52) U.S. Cl.
CPC .............. *B29C 51/44* (2013.01); *B29C 51/08* (2013.01); *B29C 51/38* (2013.01); *B29C 51/04* (2013.01); *B29C 2791/007* (2013.01); *B29K 2995/0091* (2013.01); *B29L 2031/7132* (2013.01)

(58) Field of Classification Search
CPC ......... B29C 51/44; B29C 51/38; B29C 51/08; B29C 51/04; B29K 2995/0091
USPC .................................. 425/398, 403.1, 436 R
See application file for complete search history.

(56) References Cited

U.S. PATENT DOCUMENTS

| | | | |
|---|---|---|---|
| 2,979,771 A | 4/1961 | Taber | |
| 4,822,553 A | 4/1989 | Marshall | |
| 5,195,619 A * | 3/1993 | Dourson | ................. F16F 9/003 |
| | | | 188/266.3 |
| 6,250,909 B1 | 6/2001 | Seger, Jr. | |

(Continued)

FOREIGN PATENT DOCUMENTS

| | | |
|---|---|---|
| EP | 1163996 A2 | 12/2001 |
| TW | 200911507 A | 3/2009 |

OTHER PUBLICATIONS

International Preliminary Report on Patentability dated Oct. 14, 2015.

(Continued)

*Primary Examiner* — Joseph S Del Sole
*Assistant Examiner* — Mohamed K Ahmed Ali
(74) *Attorney, Agent, or Firm* — Cantor Colburn LLP

(57) ABSTRACT

The present application relates to a thermoforming device. According to an embodiment, the thermoforming device includes a gaseous medium damper for damping a relative movement of the lower mold and the upper mold and/or a gaseous medium damper for damping a relative movement of the lower mold and the ejector plate.

13 Claims, 3 Drawing Sheets

(56) References Cited

U.S. PATENT DOCUMENTS

| | | | |
|---|---|---|---|
| 6,286,350 B1 | 9/2001 | Schoenenberger et al. |
| 6,440,354 B1 | 8/2002 | Takai et al. |
| 2002/0027308 A1 | 3/2002 | Koppenhofer |
| 2004/0256397 A1 | 12/2004 | Nakazato et al. |
| 2006/0284349 A1 | 12/2006 | Castiglioni et al. |
| 2009/0229960 A1 | 9/2009 | Ishii et al. |
| 2012/0164257 A1 | 6/2012 | Roussel |

OTHER PUBLICATIONS

International Search Report PCT/ISA/210 for International Application No. PCT/NL2014/050427 dated Sep. 9, 2014.
Written Opinion of the International Searching Authority PCT/ISA/237 for International Application No. PPCT/NL2014/050427 dated Sep. 9, 2014.
TW Search Report dated Jul. 6, 2017 re: Application No. 103122246; pp. 1-7; citing: U.S. Pat. No. 4,822,553 A, TW 200300108 A, TW 200517243 A, TW 200911507 A, CN 12985329 A, CN 1263816 A, CN 101248501 A and CN 102625745 A.

* cited by examiner

THERMOFORMING DEVICE

The present invention relates to a thermoforming device. Such a device as defined by the preamble of claim 1 is already known.

Thermoforming is a known technique for manufacturing products from a plastic layer, usually in the form of a sheet or foil. This technique makes use of the fact that with sufficient heating the form of thermoplastic materials such as polypropylene (PP), polystyrene (PS) or polyethylene (PET) can be changed.

A typical thermoforming device comprises two moulds, an upper and lower mould. The heated plastic material is introduced here between the two moulds. After the moulds have been moved toward each other the plastic material is carried by a pre-stretcher into mould cavities of the mould. These mould cavities are defined by the walls of a forming sleeve and are usually present in the lower mould. A forming base is also incorporated in the forming sleeve to form the base of the product. An increased pressure is applied to press the plastic against the wall and the base of the mould cavity. Because the wall and the base of the cavity are kept at relatively low temperature, the plastic will take on a fixed form. The combination of upper and lower mould usually comprises a plurality of mould cavities, and so a plurality of forming sleeves as well. A plurality of products can hereby be formed from one sheet or foil.

After the products have been formed the products are knocked out of the lower mould by moving the lower mould and an ejector plate toward each other. Mounted on the ejector plate are one or more knock-out pins, which are in turn connected to the forming bases. The forming bases are moved by moving the knock-out pin toward the lower mould, whereby the products are knocked out of the mould cavities.

The ejector plate is usually driven pneumatically or hydraulically. Use is made here of a cylinder which is connected to a frame of the thermoforming device. It is important to note here that the throughput speed of the thermoforming device also depends on the speed with which the products can be knocked out and the speed with which the lower mould and upper mould can be moved toward each other for the purpose of forming the product. It will be apparent to the skilled person that great forces are required to achieve high speeds. These forces have to be adequately damped in order to prevent excessively hard contact of components of the thermoforming device.

In the known thermoforming devices use is made of oil dampers for damping the movements in the thermoforming device, for instance the movement toward each other of the ejector plate and the lower mould, the movement toward each other of the upper mould and the lower mould and/or the movement toward each other of the frame and the lower or upper mould.

A problem which occurs in the known thermoforming devices is that important components of these devices are highly susceptible to wear. Examples are wear to the bearings for guiding the movement of the ejector plate toward the lower mould and wear or deformation of the knock-out pins themselves.

U.S. Pat. No. 4,822,553 discloses a thermoforming device wherein the mould part comprising the forming sleeve comprises a part that is moveably received in the mould which part, during forming the product, forms an undercut near the top side of the product. The mould further comprises a moveable clamping frame. The part forming the undercut is pressed against the clamping frame by an air spring. During the ejection of the formed product, the clamping frame is moved away from the mould, whereby, due to the air spring, the part forming the undercut will make an outward movement thereby pushing the product out of the forming sleeve.

EP 1163996 discloses a thermoforming device wherein the ejector plate is connected to the forming base by means of a knock-out pin and wherein the forming base makes a small movement during the forming of the product such that the bottom of the product is provided with an edge. The small movement can be realised because the knock-out pin is not connected to the ejector plate directly, but to a support plate. An air cylinder is formed between the support plate and the ejector plate. By driving this cylinder, the small movement can be made.

U.S. Pat. No. 6,250,909 discloses a thermoforming device wherein the plastic foil is pressed against a pressure mould by means of gas spring cylinders.

Also with the thermoforming devices mentioned above, the danger exists that the different parts in the thermoforming device hit each other during mutual movement too hard due to the fact that the gas spring cylinders do not provide damping for the mutual movement(s). A further drawback of gas spring cylinders is that they loose pressing force when leaking.

An object of the present invention is to provide a thermoforming device wherein the above stated problems do not occur, or hardly so.

The invention provides for this purpose a thermoforming device which is characterized in that the thermoforming device comprises a gaseous medium damper for damping a relative movement of the lower mould and the upper mould and/or in that the thermoforming device comprises a gaseous medium damper for damping a relative movement of the lower mould and the ejector plate.

It has been found that the underlying reason for the accelerated wear of the above stated components is the non-uniform ageing or deterioration of the used oil dampers. The damper characteristics of the different dampers are hereby no longer identical after a time, and the total damping will decrease. As a result hereof the forces exerted on for instance the ejector plate or lower mould will not be symmetrical and/or will be too great. It is noted here that for damping of the movement of the ejector plate use is usually made of four dampers positioned in the corners of the plate. In other embodiments an even number of dampers is used. If one or more of these dampers has different characteristics, the ejector plate will not be loaded symmetrically. The ejector plate deforms due to the great forces, which results in misalignment of the knock-out pins and additional wear. The misalignment of the knock-out pins also influences the position of the forming base, which in turn can cause damage to the forming parts. An incorrect position of the forming base can also influence the moulding process, since venting takes place through a gap between the forming base and the forming sleeve.

A further drawback of a damper between lower mould and ejector plate which does not function properly is that the transition of the product to the stacking device is bad. This can result in malfunctions in the stacking device, whereby the whole production line has to be stopped.

According to the invention dampers are used which operate with a gaseous medium instead of oil. It has been found that these dampers have a more uniform wear characteristic over time than oil dampers, whereby the symmetrical loading of the different components remains ensured. It has also been found that these dampers require less frequent replacement, whereby removal of the thermoforming device from the production process can be prevented.

The gaseous medium damper is preferably in communication with a reservoir with gaseous medium under pressure for the purpose of exporting gaseous medium to the reservoir during an inward movement of the damper and for the purpose of receiving gaseous medium from the reservoir during an outgoing movement of the damper. Within the context of the present invention "being in communication with" indicates that medium can flow between two parts, for instance between the reservoir and the damper.

In contrast to the oil dampers used in the prior art, continuous exchange takes place of the medium for compressing. This has advantages in respect of wear. A first advantage is that, compared to the oil damper, the heat can be better carried from the damper in that it exits the damper via the gaseous medium. The damper will hereby be less susceptible to thermal expansion and can therefore be better sealed.

A second advantage is that the medium available for the damping remains substantially constant owing to the continuous supply from the reservoir. Leakage of the oil occurs in the known oil damper. The quantity of oil in the damper will hereby decrease and the damping characteristic will change. In the damper according to the invention this damping characteristic will be more consistent and constant. A further advantage of using a reservoir is the ease with which a possible leak can be traced. Since the damper for the ejector plate is located at a position difficult to access it is difficult to visually determine leakage. In the case of the known oil damper a user could thus detect traces of oil on the outer side of the damper. The thermoforming device however has to be stopped in order to enable this. The use of a gaseous medium provides the advantage that leakage is audible as a sort of hissing sound. This is easier to detect for the user than an oil damper leaking.

The gaseous medium damper can comprise a housing, a piston rod movable in the housing, a piston mounted on an end of the piston rod and a seal between the piston and the housing for the purpose of sealing a compression chamber formed between the piston and the housing on a side of the piston remote from the piston rod. An opening in the compression chamber is provided here for the purpose of exchanging gaseous medium with the reservoir. In addition to the usual cylindrical form several other forms of the damper are possible.

The use of the above stated gaseous medium damper provides the advantage that the seal is practically the only component of the damper which is susceptible to wear. This component can be replaced in relatively simple manner. In the known oil dampers the whole damper is however usually replaced. More particularly, all dampers are usually replaced simultaneously in order to prevent asymmetrical characteristics.

The thermoforming device can further comprise a space between the housing and the piston on a side of the piston facing toward the piston rod, this space being in communication with the surrounding area. Because of the communication with the surrounding area, the pressure in this space will usually not differ greatly from the ambient pressure. The damping characteristic is hereby largely determined by the overpressure in the reservoir, generally 2-3 bar.

The space can comprise a bearing for guiding the piston rod. Because the space is in communication with the surrounding area less stringent requirements are made in respect of the sealing by the bearing.

The thermoforming device can further comprise a stop for stopping the movement of the piston rod during the outgoing movement of the piston rod. The stop forms here a mechanical limiter. The stop and the bearing can be mutually connected here. Stop and bearing can however also be an integral component.

It is recommended for the opening to comprise a throttle opening. This throttle opening delays the expulsion of gaseous medium during an ingoing movement of the damper. The pressure in the compression chamber will hereby rise above the level in the reservoir. It is particularly advantageous for the pressure in the reservoir and the dimensions of the throttle opening to be chosen such that a force exerted by the damper increases during the relative movement of the lower mould and the upper mould and/or the relative movement of the lower mould and the ejector plate. The force has to be great at the end of the movement in order to for instance slow down the ejector plate in time before it hits the lower mould. If the throttle opening is however too small, the force exerted by the damper on the ejector plate will remain too great after the ejector plate has hit the lower mould. This can result in undesired vibrations. It will be apparent to the skilled person that an equilibrium must be found which is subject to, among other things, the weight of the relevant components (ejector plate, lower mould, upper mould), the force of the cylinder which provides for the relative movement, the overpressure in the reservoir and the diameter of the throttle opening.

The pressure in the reservoir can be adjustable. This allows correction in the case that for instance a new ejector plate for use has a greatly differing weight relative to a previous ejector plate. This can occur in the event that other products are going to be produced.

The damper can be mounted in the ejector plate or the lower mould. The damper can in this case be configured for damping a movement toward each other of the ejector plate and the lower mould. The ejector plate or the lower mould can be provided here with a counter-weight for the purpose of achieving a predetermined target weight of the ejector plate or the lower mould. This makes it possible to fix the damper and the pressure adjustment of the reservoir and to absorb variations in the weight of the ejector plate or the lower mould with a counter-weight. This achieves that the relative movement of ejector plate and lower mould is damped in similar manner, irrespective of the weight of the original ejector plate or lower mould. It is however also possible to design the ejector plate or the lower mould such that it has a predetermined target weight. This can for instance be achieved by adjusting the thickness of the ejector plate.

The thermoforming device can further comprise a stop placed on or in the lower mould and engaging the damper during said damping. The stop will here engage the piston rod at a side remote from the piston.

A damper can also be mounted in one of the lower mould and the upper mould. The damper can be configured here for damping a movement toward each other of the lower mould and the upper mould. A stop placed on or in the other of the lower mould and the upper mould can also be provided here.

The thermoforming device can comprise a frame relative to which the lower mould and/or the upper mould can move. A damper can therefore be mounted in one of the lower mould, the upper mould and the frame. The damper can then be configured for damping a movement toward each other of one of the lower mould and the upper mould, and the frame.

The gaseous medium preferably comprises compressed air. This can be held under a pressure of about 2 to 4 bar in the reservoir.

The present invention will be discussed in more detail hereinbelow with reference to the accompanying figures, in which.

Figure 1:
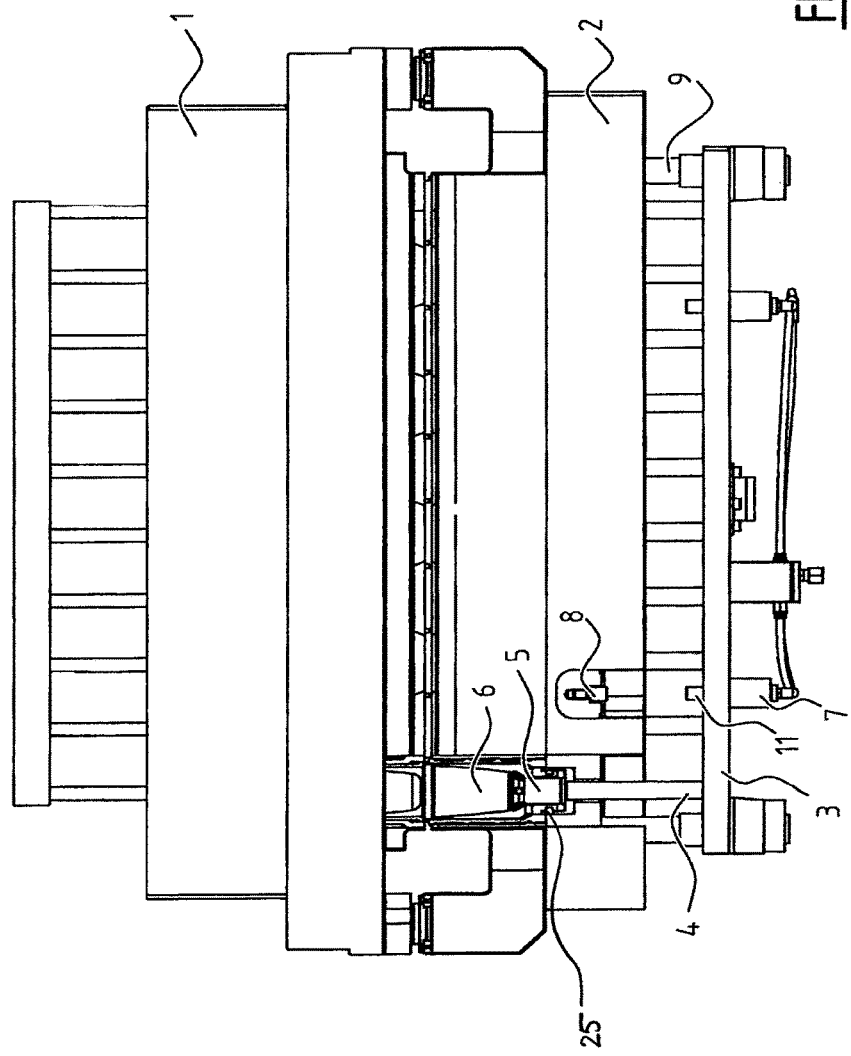
FIG. 1 shows a schematic view of an embodiment of a thermoforming device according to the present invention.
Figure 3:
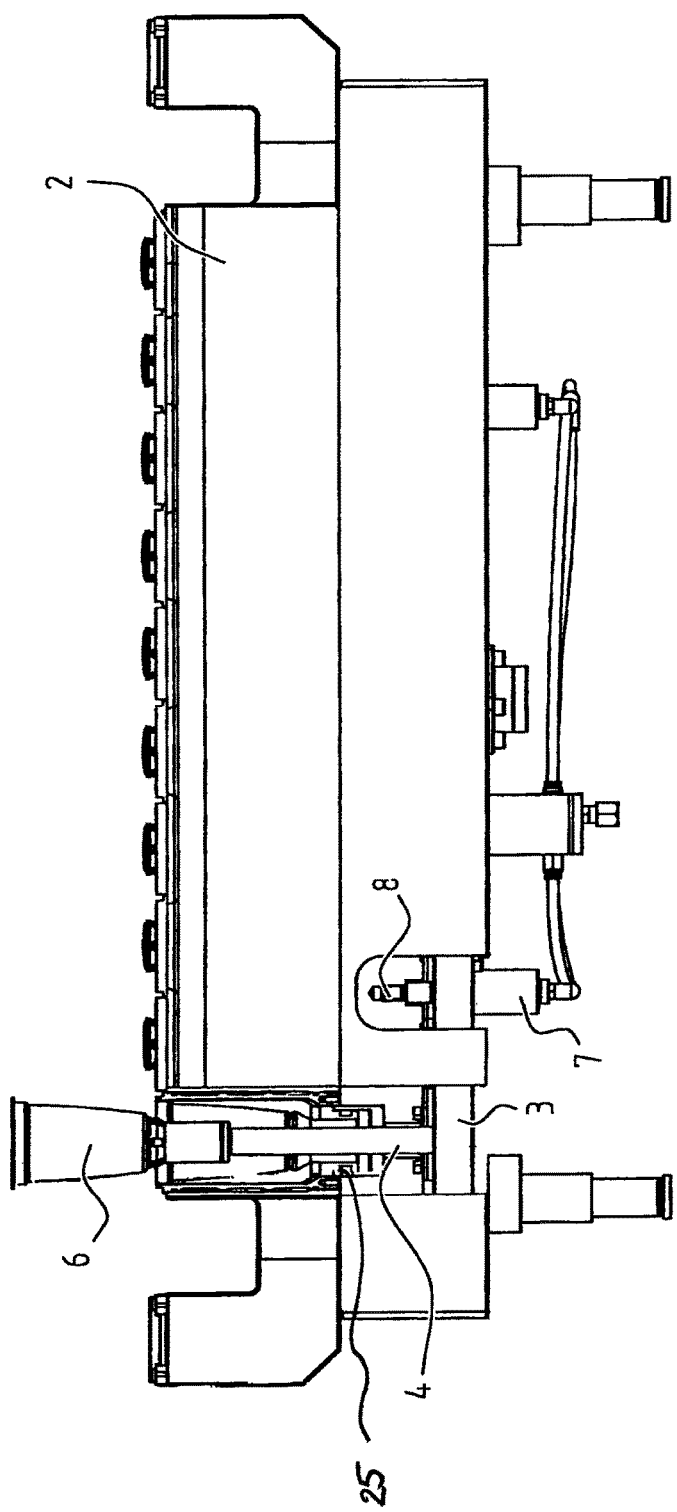
FIG. 3 shows the thermoforming device of FIG. 1, wherein the ejector plate has been moved toward the lower mould.

FIG. 1 shows an embodiment of a thermoforming device according to the present invention. The device comprises an upper mould 1, a lower mould 2 and an ejector plate 3. Mounted on ejector plate 3 are a number of knock-out pins 4 which are in turn connected to respective forming bases 5. The lower mould 2 further includes a plurality of forming sleeves 25, as seen in FIGS. 1 and 3. The products 6 formed in lower mould 2 can be knocked out by moving the knock-out pins 4.

FIG. 1 shows one product 6 schematically so that it becomes clear how knock-out pin 4 can eject product 6.

FIG. 1 further shows dampers 7 which co-act with a stop 8 in lower mould 2. Further provided is a guide 9 for guiding the relative movement between lower mould 2 and ejector plate 3.

Figure 2:
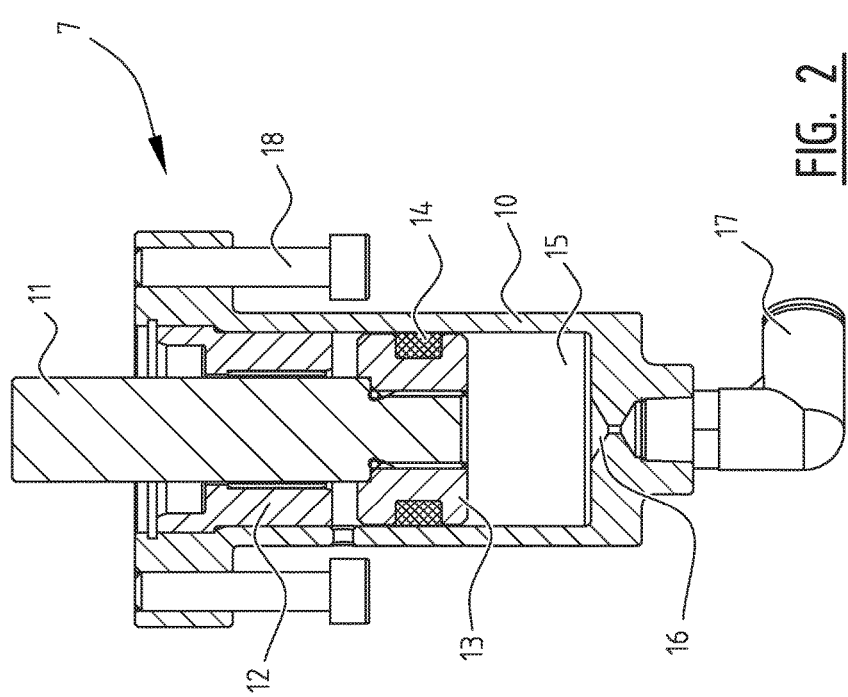
FIG. 2 shows a section of the damper of FIG. 1.

FIG. 2 shows a section of damper 7. This comprises a housing 10 which takes a cylindrical form in FIG. 2. Received in housing 10 is a piston rod 11 which can move in length direction by means of a bearing 12. Piston rod 11 is connected at an end to a piston 13. Received in piston 13 is a seal 14, for instance in the form of a rubber ring, which provides for a sealing of compression chamber 15. A throttle opening 16 provides for communication between compression chamber 15 and a reservoir via a conduit 17. Damper 7 is mounted in lower mould 2 by means of bolts 18. Other forms of mounting of damper 7, such as clamping or screwing, are however not precluded.

The reservoir (not shown) comprises compressed air which is under a pressure of about 3 bar. In non-loaded state of damper 7 this pressure ensures that piston 13 comes up against bearing 12, which also functions as stop. The space between piston 13 and bearing 12 is here in communication with the surrounding area so that the pressure in this space will amount to about 1 bar.

When the damper is loaded and performs an ingoing movement, i.e. piston rod 11 moves in the direction of compression chamber 15 whereby the chamber becomes smaller, the pressure in compression chamber 15 will increase. This increase is caused in that the air in compression chamber 15 cannot flow away sufficiently quickly via throttle opening 16. In addition to the speed with which piston rod 11 moves, the diameter of throttle opening 16 largely determines the build-up of force.

Ejector plate 3 is moved in the direction of lower mould 2 by means of a hydraulic or pneumatic cylinder. This is accompanied by high speeds and great forces. For the purpose of achieving adequate damping it is recommended for the force exerted by piston rod 11 on lower mould 2 to increase during the movement. In the case that ejector plate 3 lies against lower mould 2 the force also has to decrease again rapidly in order to prevent unnecessary vibrations. The diameter of throttle opening 16, the pressure in the reservoir, the diameter of piston 13, the force of the hydraulic or pneumatic cylinder and the weight of ejector plate 3 are important design parameters here.

Because bearing 12 does not provide sufficient sealing of the space between piston 13 and bearing 12, air will flow from compression chamber 15 via the above stated space to the surrounding area if seal 14 leaks. This produces a hissing sound, making leakage detectable without components of the thermoforming device having to be removed, as is usual with oil dampers.

Because a continuous supply is possible from the reservoir, the quantity of medium for compressing at the air damper is substantially constant. This in contrast to a leaking oil damper, wherein the quantity decreases over time. This also makes the damping characteristic of the air damper more constant over time. Whether seal 14 does or does not completely seal also has little to no effect on the damping characteristic as long as the effective passage for air through or along seal 14 is considerably smaller than throttle opening 16.

A further advantage of damper 7 is that seal 14 is the only component which requires replacement. Compared to oil dampers it is thus not necessary to replace the whole damper or to replace all dampers simultaneously in order to prevent asymmetry.

FIG. 3 shows the situation wherein ejector plate 3 lies wholly against lower mould 2. It can be clearly seen how product 6 is knocked out. In this situation, piston rod 11 has been moved completely inward. The thermoforming device can be designed here such that in the situation shown in FIG. 3 a small compression chamber 15 remains in order to prevent contact between piston 13 and housing 10. Measures can however also or instead be taken to reduce the influence of the contact between piston 13 and housing 10.

It will be apparent to the skilled person that the invention is not limited to the embodiments shown and discussed here but that modifications are possible without departing from the scope of protection as defined by the appended claims.

The invention claimed is:

1. Thermoforming device, comprising,
   a lower mould, including a plurality of forming sleeves and a plurality of forming bases, wherein walls of each of the plurality of forming sleeve define a respective cavity of the mould and wherein a respective forming base is incorporated in each of the plurality of forming sleeves to form a base of a product;
   an upper mould;
   one or more knock-out pins;
   a gaseous medium damper; and
   an ejector plate, wherein the one or more knock-out pins are mounted on the ejector plate, the one or more knock-out pins being connected to the forming bases;
   wherein the thermoforming device is configured to form said product from a plastic foil by moving the lower mould and the upper mould toward each other and is configured to knock the product out of the lower mould by moving the lower mould and the ejector plate toward each other, wherein the gaseous medium damper is mounted in the ejector plate or the lower mould;
   wherein the gaseous medium damper includes:
      a housing;
      a piston rod movable in the housing, and configured to engage the lower mould or the ejector plate;
      a piston mounted on an end of the piston rod;
      a seal between the piston and the housing to seal a compression chamber formed between the piston and the housing on a side of the piston remote from the piston rod; and an opening in the compression chamber to exchange gaseous medium with a reservoir with gaseous medium under pressure;

wherein the gaseous medium damper is configured to damp the movement toward each other of the ejector plate and the lower mould and wherein the gaseous medium damper is in communication with said reservoir to export gaseous medium to the reservoir during an inward movement of the damper and to receive gaseous medium from the reservoir during an outgoing movement of the damper.

2. Thermoforming device as claimed in claim 1, wherein the opening comprises a throttle opening, wherein the pressure in the reservoir and the dimensions of the throttle opening are chosen such that a force exerted by the damper increases during the relative movement of the lower mould and the ejector plate.

3. Thermoforming device as claimed in claim 2, wherein the pressure in the reservoir and the dimensions of the throttle opening are chosen such that the force exerted by the damper decreases rapidly when the ejector plate comes to lie against the lower mould in order to prevent unnecessary vibrations.

4. Thermoforming device as claimed in claim 1, wherein the knock-out pins are fixedly connected to the ejector plate.

5. Thermoforming device as claimed in claim 1, wherein the damper is mounted in the ejector plate, said lower mould further comprising a stop placed in or on said lower mould for engaging the piston rod of said damper during said damping.

6. Thermoforming device as claimed in claim 5, wherein the stop is arranged laterally offset from the mould cavities.

7. Thermoforming device as claimed in claim 1, wherein a space is formed between the housing and the piston on a side of the piston facing toward the piston rod, the space being in communication with the surrounding area.

8. Thermoforming device as claimed in claim 7, wherein a bearing, to guide the piston rod, is included in the space.

9. Thermoforming device as claimed in claim 8, wherein the damper further includes a stop for stopping the movement of the piston rod during the outgoing movement of the piston rod.

10. Thermoforming device as claimed in claim 9, wherein the stop and the bearing are mutually connected or are an integral component.

11. Thermoforming device as claimed in claim 1, wherein the pressure in the reservoir is adjustable.

12. Thermoforming device as claimed in claim 1, wherein the ejector plate or the lower mould is provided with a counter-weight to achieve a target weight of the ejector plate or the lower mould.

13. Thermoforming device as claimed in claim 1, wherein the gaseous medium comprises compressed air.

* * * * *